United States Patent
Hellweg et al.

(10) Patent No.: US 6,505,506 B1
(45) Date of Patent: Jan. 14, 2003

(54) METHOD AND DEVICE FOR INFLUENCING THE TRACTION OF AUTOMOBILE TIRES AS WELL AS SUITABLE AUTOMOBILE TIRES FOR THIS METHOD

(75) Inventors: Hans-Bernd Hellweg, Seelze (DE); Michael Gilnz, Neustadt (DE); Günter Homt, Garbsen (DE)

(73) Assignee: Continental Aktiengesellschaft, Hannover (DE)

(*) Notice: Subject to any disclaimer, the term of this patent is extended or adjusted under 35 U.S.C. 154(b) by 0 days.

(21) Appl. No.: 09/563,346

(22) Filed: May 3, 2000

(30) Foreign Application Priority Data

May 7, 1999 (DE) .......................................... 199 20 952

(51) Int. Cl.$^7$ .............................................. E01C 23/00

(52) U.S. Cl. .................................. 73/146; 73/8; 180/271

(58) Field of Search ................................ 180/271, 197; 280/727, 757; 73/146, 8, 9

(56) References Cited

U.S. PATENT DOCUMENTS 5,350,035 A * 9/1994 Bodier et al. ................ 180/271

FOREIGN PATENT DOCUMENTS

| DE | 4115367 | 11/1992 |
| JP | 5-256738 | * 1/1994 ........... G01M/17/02 |

* cited by examiner

Primary Examiner—William Oen
Assistant Examiner—Jermaine Jenkins
(74) Attorney, Agent, or Firm—Smith, Gambrell & Russell, LLP

(57) ABSTRACT

A method for influencing traction of motor vehicle tires made from polymer materials which are mounted and in the operating/driving state, in particular, pneumatic tires for motor vehicles, wherein an ionized gas (plasma) is generated in the vicinity of the surface of the rolling tire that is in the operating state, and wherein the ionized gas is conveyed onto a region of the surface in such a way that the ionized gas acts upon the respective surface region before said surface region rolls into the road contact surface region of the tire.

3 Claims, 1 Drawing Sheet

METHOD AND DEVICE FOR INFLUENCING THE TRACTION OF AUTOMOBILE TIRES AS WELL AS SUITABLE AUTOMOBILE TIRES FOR THIS METHOD

INTRODUCTION AND BACKGROUND

The present invention pertains to a method for influencing the traction of automobile tires made from polymer materials which are mounted and in the operating/driving state, in particular, pneumatic tires for motor vehicles.

The traction of an automobile tire represents the only link between the road and the automobile and consequently is of the utmost importance in all driving conditions, e.g., for lateral traction, steering, transmitting deceleration and acceleration forces, etc.

Weather-related changes of the road or the ground or other influences on traction caused by the condition of the road surface, i.e., a wet or icy road, usually result in safety risks and accidents due to the loss of traction.

Various measures according to the state of the art are used for increasing traction of an automobile tire in such instances.

One option is the arrangement of studs or similar elements over the running surface band of the tire; however, this has the disadvantage that the road surface is subject to increased wear when the road is dry.

Another known option consists of spraying sand or a similar medium or even chemical substances onto the road in front of the automobile tire in order to increase traction. However, the problem with this solution lies in the dirtying of the road and the removal of these materials.

It is therefore an object of the present invention to influence or increase traction of mounted automobile tires that are in the operating/driving state which eliminates the above-mentioned disadvantages.

The above and other objects of the present invention can be achieved by a method for influencing the traction of automobile tires made from polymer materials which are mounted and in the operating/driving state, in particular, pneumatic tires for motor vehicles, wherein an ionized gas or plasma is generated in the vicinity of the surface of the rolling automobile tire that is in the operating state. The ionized gas is conveyed onto a region of the tire surface in such a way that the ionized gas acts upon the respective surface region before this surface region rolls into the road contact surface region of the tire.

It is a feature of the invention that the ionized gas is generated and conveyed onto a region of the tire surface depending on the driving conditions, e.g., during braking maneuvers, acceleration, steering maneuvers, while driving around curves, etc.

In carrying out the present invention, there is a device arranged on the motor vehicle which contains the following:

a) a device for generating an ionized gas which is arranged in the vicinity of the tire surface and contains a guide element/nozzle for conveying the ionized gas onto a region of the tire surface that, with respect to the rolling motion of the tire, occupies a location shortly before it rolls into the road contact surface of the tire, b) distance measuring and positioning devices for positioning the device for generating an ionized gas and the guide element/nozzle relative to the tire surface, c) sensors and corresponding processing devices for measuring the parameters that characterize the driving condition, e.g., the rotational speed of the wheels, the wheel slip, the wheel position, braking maneuvers, acceleration and steering maneuvers or driving around curves, d) one or more storage devices for tire data and reference values for the driving conditions, and e) a processing unit for controlling and regulating the generation and the guidance of the ionized gas based on the measured parameters and stored values.

Another feature of the invention resides in an automobile tire where the outer surface of the automobile tire contains, at least in partial regions, a mixture that has a defined reactivity under the influence of an ionized gas.

BRIEF DESCRIPTION OF THE DRAWING

The present invention will be further understood with reference to the accompanying drawing, wherein.

DETAILED DESCRIPTION OF INVENTION

Figure 1:
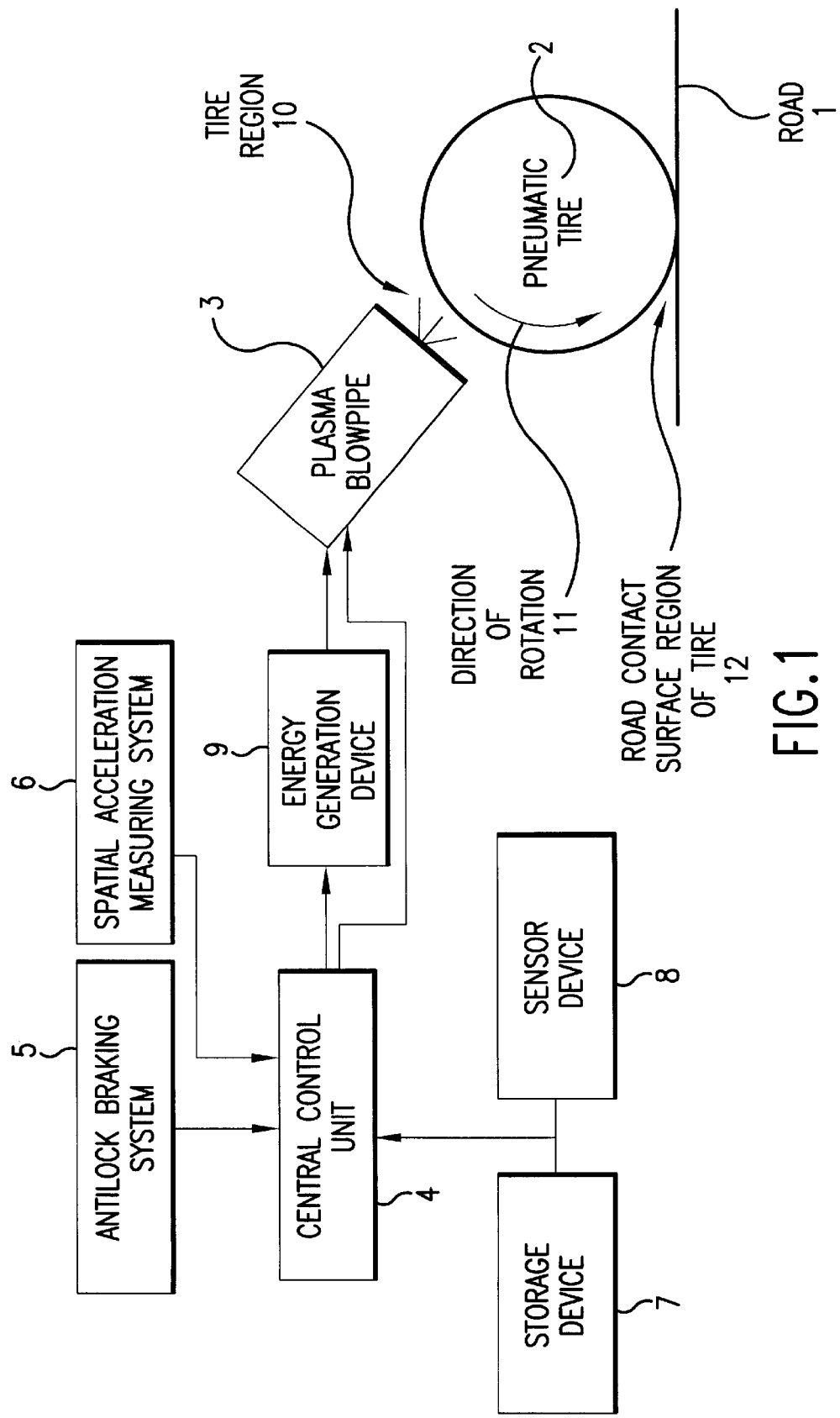
FIG. 1 shows a schematic representation of an automobile tire and the system of the invention.

According to the invention, an ionized gas (plasma) is generated in the vicinity of the surface of the rolling automobile tire that is in the operating state, with the ionized gas being conveyed onto a region of the tire surface in such a way that the ionized gas acts upon the respective tire surface region before this tire surface region rolls into the tire contact surface.

Due to the influence of the ionized gas on the respective tire surface region, different effects that increase traction and, depending on the type of ionized gas used, can be variably defined occur—more or less rapidly—at this location, individually or in combination; these effects essentially include a) the cleaning of organic contaminants from the tire surface, b) the etching on microscopically thin regions of the surface material of the automobile tire such that an interface with inferior traction is removed and the surface is enlarged, whereby micropores may also be formed, c) depending on the type of ionized gas and the surface material, a splitting or bonding of molecule structures in the vicinity of the surface and consequently an increase in the binding possibilities, e.g., due to depolymerization (generation of shorter polymer chains, oligomers and monomers), and d) a modification of the chemical structure and an ionization of the respective surface material of the automobile tire, where free radicals that built up high binding forces with adjacent surfaces may be produced either in the form of a reaction with the ionized gas or a subsequent reaction with the ambient atmosphere.

This method reliably prevents the dirtying of or damage to the road surface. Due to the relatively short-term exposure and the small penetration depth into the surface of the automobile tire which is limited to the molecular range, the structure and stability of the tire is not noticeably influenced—also with respect to the service life—during such a treatment. A noticeable increase in traction is achieved in all road conditions, i.e., not only on a wet or icy road, but also on a dry road.

The generation of an ionized gas conventionally takes place in a plasma, e.g., in a low-pressure plasma. This is usually achieved in the form of an energy discharge between two electrodes, whereafter the plasma cloud and consequently the ionized gas are conveyed onto a region of the surface of the automobile tire with the aid of a gas stream, i.e., via a nozzle or similar device. It goes without saying that other types of plasma generation may be utilized. This naturally incorporates a device for making available the (high-voltage) energy for the device that serves for generating the plasma.

The plasma gas used and/or the gas for the guide or transport flow may simply consist of air that is made available by a blower or by corresponding guide elements for the relative velocity.

According to another advantageous embodiment of this method, the ionized gas is generated as a function of the driving conditions, e.g., during braking maneuvers, acceleration, steering maneuvers, while driving around curves, etc., with the ionized gas being conveyed onto a region of the tire surface such that the time of operation and the wear of the corresponding devices as well as the energy requirement are reduced. In this embodiment, the influence of the plasma on the structure and integrity of the tire is additionally reduced, and the increase in traction is exclusively limited to actual dangerous situations.

A particularly suitable device for carrying out the method for influencing traction of mounted automobile tires of polymer materials which are in the operational state/driving state, in particular, of pneumatic tires for motor vehicles, is arranged on the motor vehicle and essentially contains the following devices:

a) a device for generating an ionized gas which is arranged in the vicinity of the tire surface and contains a guide element/nozzle for conveying the ionized gas onto a region of the tire surface which, with respect to the rolling motion of the tire, is situated shortly before it rolls into the tire contact surface, b) distance measuring and positioning devices for positioning the device for generating an ionized gas and the guide element/nozzle relative to the tire surface, c) at least one sensor and corresponding processing device for measuring the parameters that characterize the driving condition, e.g., the rotational speed of the wheels, the wheel slip, the wheel position, braking maneuvers, acceleration maneuvers and steering maneuvers or driving around curves, d) one or more storage devices for tire data and reference values for the driving conditions and e) a processing unit for controlling and regulating the generation and the guidance of the ionized gas based on the measured parameters and stored values.

Such a design of the device for carrying out the previously described method makes it possible to execute all control processes required for safely applying the ionized gas/plasma. The energy and consequently the previously cited effects triggered by this energy can be controlled with respect to their action and duration, in particular, by regulating the relative distance between the location at which the plasma is generated and the tire surface.

An automobile tire that is particularly suitable for such a method will have an outer surface that, at least in limited regions, contains a mixture that has a defined reactivity under the influence of an ionized gas.

With respect to a defined reactivity under the influence of an ionized gas, a very suitable material is, for example, natural rubber; however, other polymer materials can be correspondingly adapted with suitable additives.

The arrangement of such mixtures in partial regions of the tire surface can be achieved in such a way that only a revolving partial width or individual revolving rows of profiles or elevations formed by these profiles over the running surface band consist of the reactive mixture. This can be easily achieved with conventional extrusion methods. Other arrangements, e.g., a distributed punctiform arrangement (spots) of such mixtures, may also be considered. The remaining—non-reactive—regions can be adapted to other desirable tire characteristics and, for example, consist of mixtures with a higher silica content.

The invention is described in greater detail below with reference to one embodiment.

FIG. 1 shows a highly schematized representation of an automobile pneumatic tire 2 as it rolls on a road 1. A plasma blowpipe 3 that generates an ionized gas and also contains nozzles as well as guide and positioning devices that are not illustrated in detail is arranged in the immediate vicinity of the tire adjacent to its outer circumference.

A central control unit 4 processes the parameters that are received from the sensors of an antilock braking system (ABS) 5 and from the sensors of a spatial acceleration measuring system 6 and represent the driving condition, e.g., the rotational speed of the wheels, the wheel slip, the wheel position, deceleration and acceleration values, as well as the tire data and reference values for the driving conditions which are respectively contained and generated in the storage and sensor devices 7 and 8. The control unit then determines actuating signals from the aforementioned data and forwards these actuating signals to the energy generation device 9 and the plasma blowpipe 3 so as to control and regulate the generation and the guidance of the ionized gas based on the measured parameters and stored values.

The ionized gas acts upon a region 10 of the pneumatic tire 2 that rolls in the direction 11, with said region occupying a location on the tire shortly before it rolls into the road contact surface region of the tire 12.

Further variations and modifications of the foregoing will be apparent to those skilled in the art and are intended to be encompassed by the claims appended hereto.

We claim:

1. A method for influencing tire traction of motor vehicle tires which are made of polymer materials and which are mounted and in a rolling condition, said method comprising:

conveying an ionized gas to a vicinity of a surface of the tire while the tire is rolling; and directing the ionized gas only onto a region of the surface of said tire that is not in contact with the underground road surface but will come into contact with the underground road surface during rolling of the tire, causing modification of a chemical structure of the polymer materials of said tire surface region by influence of the ionzed gas on said chemical structure, thereby improving tire traction properties of the tire.

2. The method according to claim 1, further comprising conveying the ionized gas onto the region of the tire surface as the underground road surface varies due to environmental conditions.

3. A device for influencing tire traction for motor tires made from polymer materials, which tires are mounted and in a rolling condition said device being arranged on the motor vehicle and comprising:

a device for generating an ionized gas which device is arranged in a vicinity of a tire surface and contains a guide element for directing and conveying the ionized gas only onto a region of the tire surface that, with respect to a rolling motion of the tire, occupies a location that will come into contact with the underground road surface during the rolling motion;

at least one distance measuring and positioning device for positioning the device for generating an ionized gas and a guide element relative to the tire surface;

at least one sensor and corresponding processing device for measuring parameters that characterize a driving condition;

one or more storage devices for tire data and reference values for the driving conditions; and a processing unit for controlling and regulating the generation and guidance of the ionized gas based on the measured parameters and stored values.

* * * * *